(12) United States Patent
Li et al.

(10) Patent No.: US 11,820,297 B2
(45) Date of Patent: Nov. 21, 2023

(54) BRACKET, BRACKET ASSEMBLY, DEVICE ON VEHICLE ROOF AND VEHICLE

(71) Applicant: NIO TECHNOLOGY (ANHUI) CO., LTD, Hefei (CN)

(72) Inventors: William Li, Hefei (CN); Samir Agrawal, Hefei (CN); Jianyong Zhang, Hefei (CN); Waylon Chen, Hefei (CN); John Hu, Hefei (CN); Yunyue Cai, Hefei (CN); Xiaoning Gong, Hefei (CN); Shaoqing Ren, Hefei (CN); Ted Li, Hefei (CN); Gordon Cao, Hefei (CN); Jiong Chen, Hefei (CN); Matt Samson, Hefei (CN); Devin Zhang, Hefei (CN); Yunfeng Dong, Hefei (CN); Taylor Cheng, Hefei (CN); Nicole Guo, Hefei (CN)

(73) Assignee: NIO TECHNOLOGY (ANHUI) CO., LTD, Hefei (CN)

(*) Notice: Subject to any disclaimer, the term of this patent is extended or adjusted under 35 U.S.C. 154(b) by 295 days.

(21) Appl. No.: 17/148,868

(22) Filed: Jan. 14, 2021

(65) Prior Publication Data

US 2022/0212609 A1 Jul. 7, 2022

(30) Foreign Application Priority Data

Jan. 7, 2021 (CN) .......................... 202110019039.8

(51) Int. Cl.
*B60R 11/04* (2006.01)
*G01S 17/931* (2020.01)
(Continued)

(52) U.S. Cl.
CPC ................ *B60R 11/04* (2013.01); *B60Q 1/44* (2013.01); *B60R 19/483* (2013.01); *F16M 13/02* (2013.01);
(Continued)

(58) Field of Classification Search
CPC . F16M 13/02; B60R 11/04; B60R 2011/0026; B60R 2011/004; B60R 2300/105; G01S 17/931; B60Q 1/44
See application file for complete search history.

(56) References Cited

U.S. PATENT DOCUMENTS 10,802,121 B1* 10/2020 Krishnan .............. G01S 17/931
11,099,039 B2* 8/2021 Krishnan ................ G01L 19/14
(Continued)

FOREIGN PATENT DOCUMENTS

DE 102018119863 A1 * 2/2019 ........... B60Q 1/0005

OTHER PUBLICATIONS

Translation of DE-102018119863 (Year: 2019).*

*Primary Examiner* — Monica E Millner
(74) *Attorney, Agent, or Firm* — Sheridan Ross P.C.

(57) ABSTRACT

The application proposes a bracket, a bracket assembly, a device arranged on vehicle roof and a vehicle, which are applied in the field of automobile technology. The bracket comprises: a first bracket body mounted to the top of the vehicle; and a connecting body comprising: a first connecting piece arranged on the left side of the first bracket body and mounted with a first image sensor, and a second connecting piece arranged on the right side of the first bracket body and mounted with a second image sensor, wherein the first connecting piece and the second connecting piece are arranged above A pillars of the vehicle.

12 Claims, 5 Drawing Sheets

(51) Int. Cl.
*B60Q 1/44* (2006.01)
*B60R 19/48* (2006.01)
*F16M 13/02* (2006.01)
*G01S 7/481* (2006.01)
*B60R 11/00* (2006.01)

(52) U.S. Cl.
CPC ........... *G01S 7/4811* (2013.01); *G01S 17/931* (2020.01); *B60R 2011/004* (2013.01); *B60R 2011/0026* (2013.01); *B60R 2300/105* (2013.01)

(56) References Cited

U.S. PATENT DOCUMENTS

| | | | |
|---|---|---|---|
| 2016/0059865 A1* | 3/2016 | Ricci | G06Q 30/0645 |
| | | | 701/36 |
| 2017/0115387 A1* | 4/2017 | Luders | G01S 17/04 |
| 2018/0188371 A1* | 7/2018 | Bao | G01S 17/10 |
| 2019/0179028 A1* | 6/2019 | Pacala | H01S 5/146 |
| 2019/0204426 A1* | 7/2019 | Vaishnav | G01S 7/497 |
| 2020/0023788 A1* | 1/2020 | Frederick | G01S 7/02 |
| 2020/0041613 A1* | 2/2020 | Pacala | H01S 5/146 |
| 2020/0215988 A1* | 7/2020 | Jackson | G01D 11/245 |
| 2020/0386860 A1* | 12/2020 | Chung | B60R 11/04 |
| 2020/0387174 A1* | 12/2020 | Diehl | G08G 1/167 |
| 2020/0393568 A1* | 12/2020 | Grosser | G01S 17/931 |
| 2021/0148737 A1* | 5/2021 | Yamaji | G01S 13/931 |
| 2021/0199479 A1* | 7/2021 | Lau | G01D 18/008 |
| 2021/0201054 A1* | 7/2021 | Toth | G01S 17/86 |
| 2021/0286079 A1* | 9/2021 | Liu | G05D 1/0088 |
| 2021/0302541 A1* | 9/2021 | Fields | H05K 7/14 |
| 2022/0075030 A1* | 3/2022 | D'Antonio | B60R 11/04 |

\* cited by examiner

BRACKET, BRACKET ASSEMBLY, DEVICE ON VEHICLE ROOF AND VEHICLE

CROSS-REFERENCE TO RELATED APPLICATION

This application claims the benefit of Chinese Application No. 202110019039.8 filed Jan. 7, 2021, the entire contents of which are incorporated herein by reference.

TECHNICAL FIELD

The application relates to the field of automobile technology, in particular to a bracket, a bracket assembly, a device on vehicle roof and a vehicle.

BACKGROUND

With the continuous development of the automobile field, especially the development of Advanced Driving Assistance System (ADAS), the number of parts such as sensors (for example, camera, LiDAR, millimeter wave radar among others) equipped on vehicles have greatly increased. These increasing sensors have greatly increased the assembly difficulty of the vehicle manufacturing production line and increased the space requirements for structural design.

In addition, when adding cameras, radars and other parts, it is also necessary to comprehensively consider their heat dissipation requirements, wiring arrangement requirements, and sensor field of view requirements when collecting data. Improper sensor arrangement may cause the sensor field of view to be blocked, making it difficult to collect desired sensor data.

The above information disclosed in the background section of the application is only intended to increase the understanding of the overall background of the application, and should not be regarded as an acknowledgement or any form of suggestion that the information constitutes the prior art known to those of ordinary skill in the art.

SUMMARY OF INVENTION

In order to solve or at least alleviate one or more of the above problems, the following technical solutions are provided.

According to an aspect of the present application, a bracket for a vehicle is provided. The bracket comprises: a first bracket body mounted to the top of the vehicle; and a connecting body comprising: a first connecting piece arranged on the left side of the first bracket body and mounted with a first image sensor, and a second connecting piece arranged on the right side of the first bracket body and mounted with a second image sensor, wherein the first connecting piece and the second connecting piece are arranged above A pillars of the vehicle.

In the bracket according to an embodiment of the present application, the first connecting piece and the second connecting piece are arranged symmetrically along a longitudinal axis of the vehicle.

In the bracket according to an embodiment of the present application, the first bracket body is centrosymmetric along a longitudinal axis of the vehicle.

In the bracket according to an embodiment of the present application, the connecting body further comprises a third connecting piece arranged on the first bracket body and mounted with a LiDAR sensor.

In the bracket according to an embodiment of the present application, the third connecting piece is arranged on a longitudinal axis of the vehicle.

In the bracket according to an embodiment of the present application, the first bracket body is mounted to the vehicle via bolts and/or buckles.

In the bracket according to an embodiment of the present application, the connecting body is manufactured by a cast aluminum process.

According to another aspect of the present application, a bracket assembly for a vehicle is provided. The bracket assembly comprises: a first bracket body mounted to the top of the vehicle; a second bracket body mounted to the top of the vehicle; and a connecting body. The connecting body comprises a first connecting piece arranged on the left side of the first bracket body and mounted with a first image sensor, a second connecting piece arranged on the right side of the first bracket body and mounted with a second image sensor, a fourth connecting piece arranged on the second bracket body and mounted with a third image sensor. Wherein, the first connecting piece and the second connecting piece are arranged above A pillars of the vehicle. Wherein, the first bracket body and the second bracket body are arranged forward and backward along a longitudinal axis of the vehicle.

In the bracket assembly according to an embodiment of the present application, the connecting body further comprises a third connecting piece, which is arranged on the first bracket body and mounted with a LiDAR sensor.

In the bracket assembly according to an embodiment of the present application, the connecting body further comprises a fifth connecting piece, which is arranged on the second bracket body and mounted with a brake light.

In the bracket assembly according to an embodiment of the present application, the first connecting piece and the second connecting piece are arranged symmetrically along the longitudinal axis of the vehicle.

In the bracket assembly according to an embodiment of the present application, the first bracket body and the second bracket body are centrosymmetric along the longitudinal axis of the vehicle.

In the bracket assembly according to an embodiment of the present application, the third connecting piece, the fourth connecting piece and/or the fifth connecting piece are arranged on the longitudinal axis of the vehicle.

In the bracket assembly according to an embodiment of the present application, the first bracket body and the second bracket body are mounted to the vehicle via bolts and/or buckles.

In the bracket assembly according to an embodiment of the present application, the connecting body is manufactured by a cast aluminum process.

In the bracket assembly according to an embodiment of the present application, the fifth connecting piece comprises a screw connecting piece, an adhesive connecting piece and/or a tower connecting piece.

According to another aspect of the present application, a device on vehicle roof is provided. The device on vehicle roof comprises: a first bracket body mounted to the top of the vehicle; a connecting body including a first connecting piece arranged on the left side of the first bracket body, and a second connecting piece arranged on the right side of the first bracket body, wherein the first connecting piece and the second connecting piece are arranged above A pillars of the vehicle; a first image sensor mounted to the first connecting piece; and a second image sensor mounted to the second connecting piece.

In the device on vehicle roof according to an embodiment of the present application, the connecting body further comprises a third connecting piece arranged on the first bracket body. The device on vehicle roof further comprises a LiDAR mounted to the third connecting piece.

In the device on vehicle roof according to an embodiment of the present application, the device on vehicle roof further comprises a second bracket body mounted to the top of the vehicle, and the first bracket body and the second bracket body are arranged forward and backward along a longitudinal axis of the vehicle. The connecting piece further comprises a fourth connecting piece arranged on the second bracket body. The device on vehicle roof further comprises a third image sensor mounted to the fourth connecting piece.

In the device on vehicle roof according to an embodiment of the present application, the connecting body further comprises a fifth connecting piece arranged on the second bracket body, and the device on vehicle roof further comprises a brake light mounted to the fifth connecting piece.

According to another aspect of the present application, a vehicle is provided. The vehicle comprises the above-mentioned device on vehicle roof. Wherein, the first image sensor and the second image sensor are side front view image sensors.

In the vehicle according to an embodiment of the present application, the fields of view of the first image sensor and the second image sensor have overlapping areas along the forward direction of the vehicle.

In the vehicle according to an embodiment of the present application, the third image sensor is a rear view image sensor.

The vehicle according to an embodiment of the present application further comprises two side rear view image sensors respectively arranged on fenders of the vehicle.

The vehicle according to an embodiment of the present application further comprises one or more front view image sensors arranged behind the front window glass of the vehicle.

In the vehicle according to an embodiment of the present application, the number of the front view image sensors is two, and one of the front view image sensors is a wide-angle camera, and the other is a narrow-angle camera.

The vehicle according to an embodiment of the present application further comprises two surround view image sensors respectively arranged on two rear view mirrors of the vehicle, and two other surround view image sensors respectively arranged at the front side and the rear side of the vehicle.

The vehicle according to an embodiment of the present application further comprises an in-vehicle image sensor arranged on a steering pillar of the vehicle.

The vehicle according to an embodiment of the present application further comprises: a millimeter wave radar arranged on front fender of the vehicle.

The vehicle according to an embodiment of the present application further comprises: four millimeter wave radars respectively arranged on four corners of the vehicle.

BRIEF DESCRIPTION OF THE DRAWINGS

From the following detailed description in conjunction with the accompanying drawings, the above and other objectives as well as advantages of the application will be more complete and clear.

DETAILED DESCRIPTION

It should be understood that the term "vehicle" or other similar terms used herein are intended to include general motor vehicles, such as passenger vehicles (including sports utility vehicles, buses, trucks, etc.), various commercial vehicles, ships, airplanes and so on, and includes hybrid electric vehicles, electric vehicles, plug-in hybrid electric vehicles and so on. A hybrid electric vehicle is a vehicle with two or more power sources, such as gasoline-powered and electric vehicles.

It should also be noted that the terms "first", "second", "third", "fourth", "fifth" and so on in the specification and claims of this application are used to distinguish similar objects, rather than to describe a specific order or sequence. In addition, the terms "comprise", "include" and similar expressions are intended to mean non-exclusive inclusion unless specifically indicated otherwise. In addition, the term "mounted" is intended to mean mounted by direct contact or by contact through one or more intermediate components.

It should also be noted that in the specification and claims of this application, the origin of the vehicle coordinate system coincides with the center of mass, the longitudinal axis of the vehicle is intended to mean that it is parallel to the ground and points to the front of the vehicle, and the transverse axis of the vehicle is intended to mean that it is parallel to the ground and points to the left of the driver, the vertical axis of the vehicle is intended to point upward through the center of the mass of the vehicle. In addition, "forward" and "front" mean the direction in which the vehicle travels, and "rear" and "rearward" mean the opposite direction in which the vehicle travels.

Hereinafter, each exemplary embodiment according to the present application will be described in detail with reference to the accompanying drawings.

Figure 1:
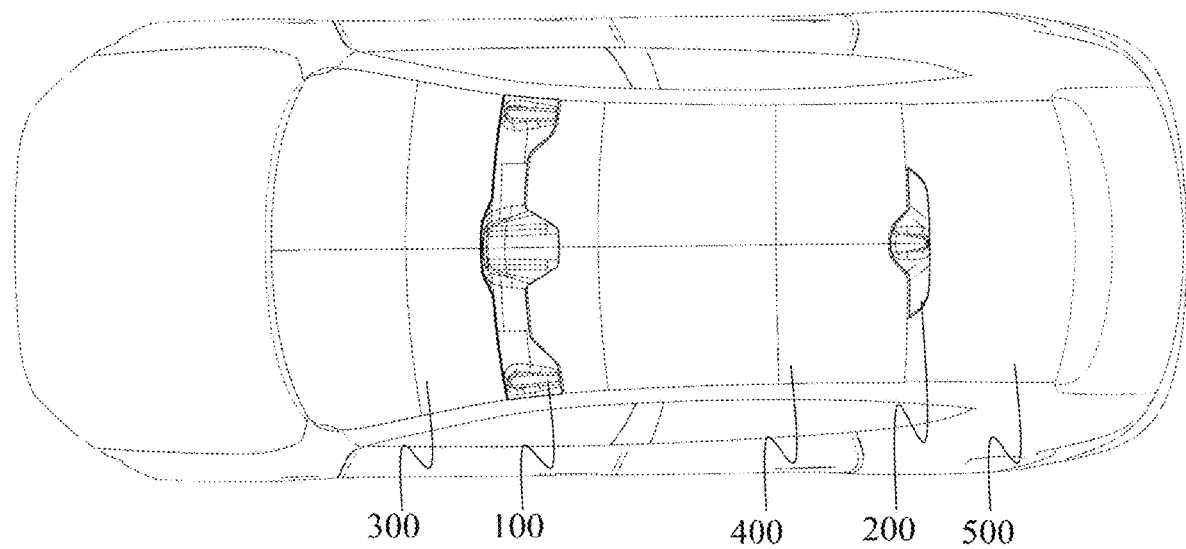
FIG. 1 shows a top view of a bracket assembly for a vehicle according to an embodiment of the present application.

FIG. 1 shows a top view of a bracket assembly for a vehicle according to an embodiment of the present application. As shown in FIG. 1, the bracket assembly includes a front bracket body 100 and a rear bracket body 200. The front bracket body 100 and the rear bracket body 200 are both mounted to the top of the vehicle. As shown in FIG. 1, the front bracket body 100 may be mounted between a front windshield 300 and a top cover 400, and the rear bracket body 200 may be mounted between the top cover 400 and a rear windshield 500. Wherein, top cover may be made from any appropriate material such as metal or glass. Wherein, the front bracket body 100 and the rear bracket body 200 can be mounted to the top of the vehicle by means of bolts, buckles, etc. In addition, the front bracket body 100 and the rear bracket body 200 may both be centrosymmetric along the longitudinal axis of the vehicle. In addition, the rear side bracket body 200 may be shark fin shaped as shown in FIG. 1, so that it can provide the vehicle with the functions of commutation, decreasing the wind resistance, conducting static electricity, etc. It should be noted that the rear side bracket discussed in this application is not limited to the shark fin shape, but can be any other suitable shape.

Figure 2:
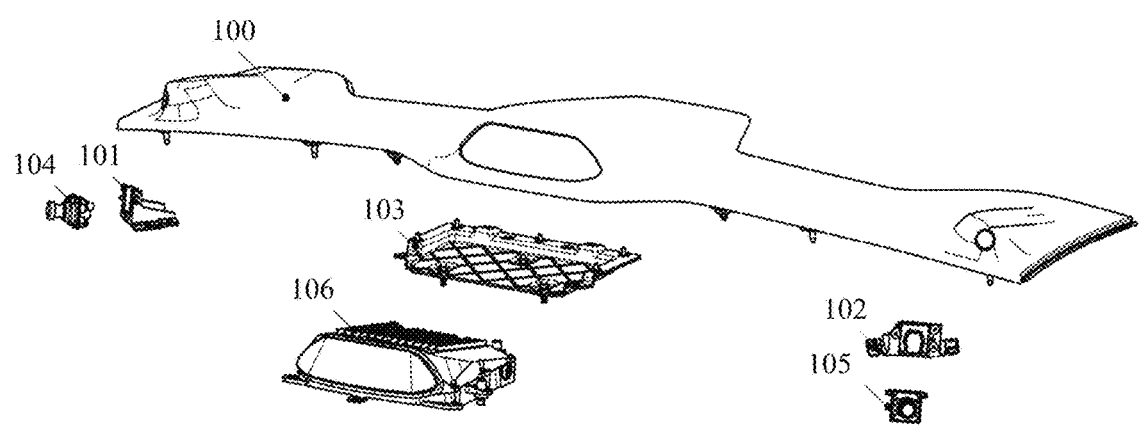
FIG. 2 shows an exploded view of a bracket for a vehicle and components mounted thereto according to an embodiment of the present application.
Figure 3:
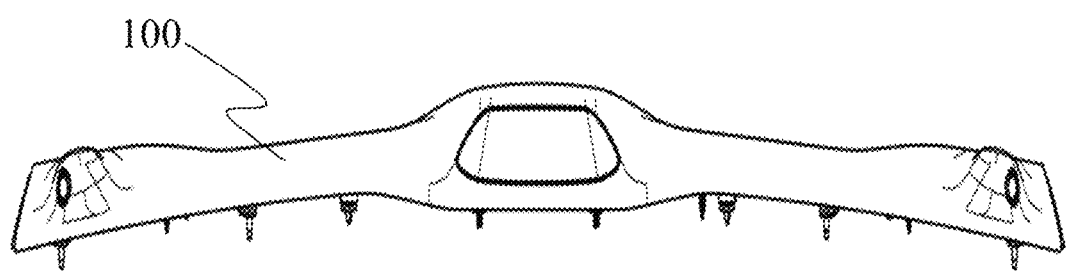
FIG. 3 shows a front view of the bracket for a vehicle shown in FIG. 2.
Figure 4:
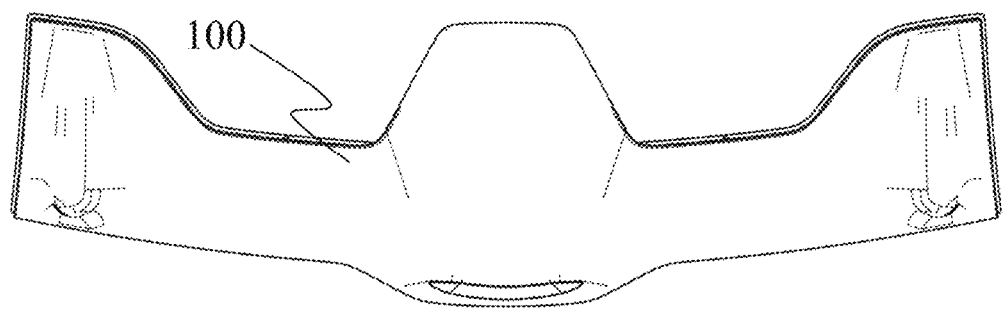
FIG. 4 shows a top view of the bracket for a vehicle shown in FIG. 2.
Figure 5:
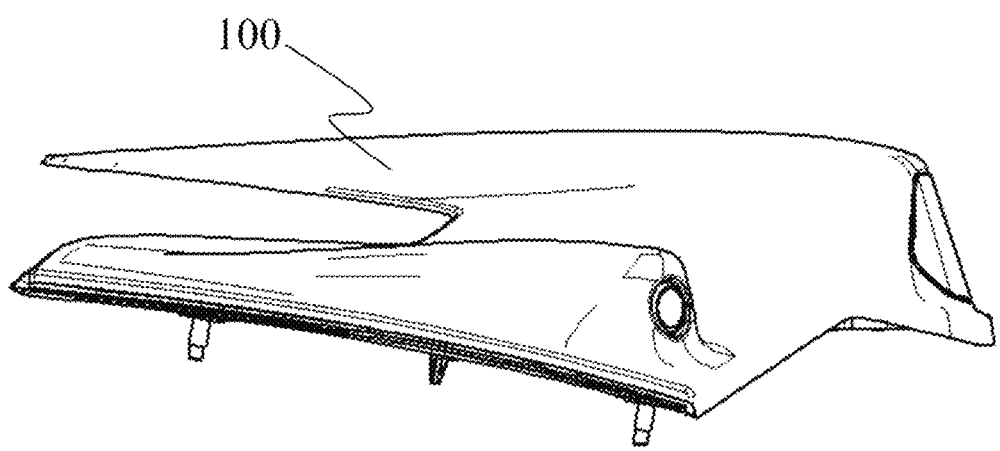
FIG. 5 shows a right side view of the bracket for a vehicle shown in FIG. 2.

FIG. 2 shows an exploded view of a bracket for a vehicle and components mounted thereto according to an embodiment of the present application. Wherein, the front bracket body 100, the image sensor connecting piece 101, the image sensor connecting piece 102 and the LiDAR connecting piece 103 constitute the bracket. Further, the front view, top view, and right side view of the bracket can be referred to FIG. 3, FIGS. 4, and FIG. 5, respectively.

Continuing with FIG. 2, the image sensor connecting piece 101 and the image sensor connecting piece 102 are respectively arranged on the left and right sides of the front bracket body 100. Further, the image sensor connecting piece 101 and the image sensor connecting piece 102 may be centrosymmetric along the longitudinal axis of the vehicle. In this way, the image sensor connecting piece 101 and the image sensor connecting piece 102 are located above an A pillar of the vehicle, which can also be shown in FIG. 1. Wherein, "the left and right sides" is intended to mean the left and right sides along the lateral Y axis of the vehicle. This allows the image sensor mounted thereto to have a wide field of view, reducing the blind zone of field of view for the image sensor.

The image sensor connecting piece 101 and the image sensor connecting piece 102 are respectively mounted with image sensor 104 and image sensor 105, thereby fixing the image sensor 104 and the image sensor 105 on the top of the vehicle symmetrically along the longitudinal axis of the vehicle. Wherein, the image sensor 104 and the image sensor 105 may be side front view image sensors, and the field of view between the two may have an overlapping area in the forward direction of the vehicle, so as to realize binocular ranging, and cooperate with each other to realize a full coverage of the forward field of view of the vehicle.

The LiDAR connecting piece 103 is mounted to the front bracket body 100 and is also mounted with a LiDAR 106. In this way, the LiDAR 106 is fixed on the top of the vehicle via the LiDAR connecting piece 103. Further, the LiDAR connecting piece 103 may be arranged on the longitudinal axis of the vehicle. Wherein, LiDAR 106 can cover scenes that cannot be accurately identified by the image sensors 104 and 105, such as large stationary objects, dark scenes at night, etc. Further, the LiDAR 106 can also dynamically adjust region of interest (ROI), thereby performing real-time and dynamic tracking for key targets and dynamic staring key areas based on states of the vehicle.

Figure 6:
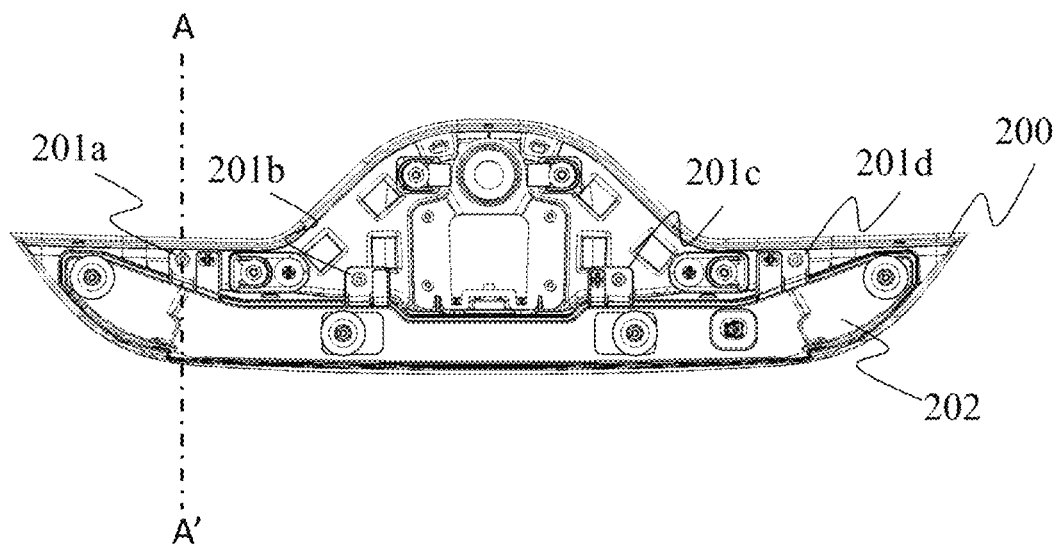
FIG. 6 shows a bottom view of a rear bracket body and components mounted thereto according to an embodiment of the present application.

FIG. 6 shows a bottom view of a rear side bracket body and components mounted thereto according to an embodiment of the present application. The rear bracket body 200 shown in FIG. 6 has brake light connecting pieces 201 (specifically, brake light connecting pieces 201a, 201b, 201c, and 201d) arranged thereon. A high-mount brake light 202 is mounted to the brake light connecting pieces 201a, 201b, 201c and 201d, so as to fix the high-mount brake light 202 on the rear bracket body 200. The brake light connecting pieces 201a, 201b, 201c, and 201d may be four connecting pieces as shown in FIG. 6, or any appropriate number of connecting pieces depending on the situation. In addition, the brake light connecting pieces 201a, 201b, 201c, and 201d may be integrated with the rear bracket body 200, or may be separate components from the rear bracket body 200. The high-mount brake light 202 may be mounted to the brake light connecting pieces 201a, 201b, 201c, and 201d by means of self-tapping screws, bolts, and the like.

Figure 7:
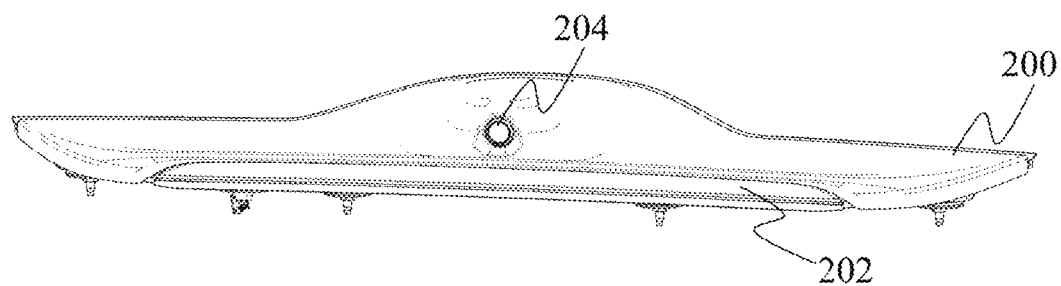
FIG. 7 shows a rear view of a rear bracket body and components mounted thereto according to an embodiment of the present application.
Figure 8:
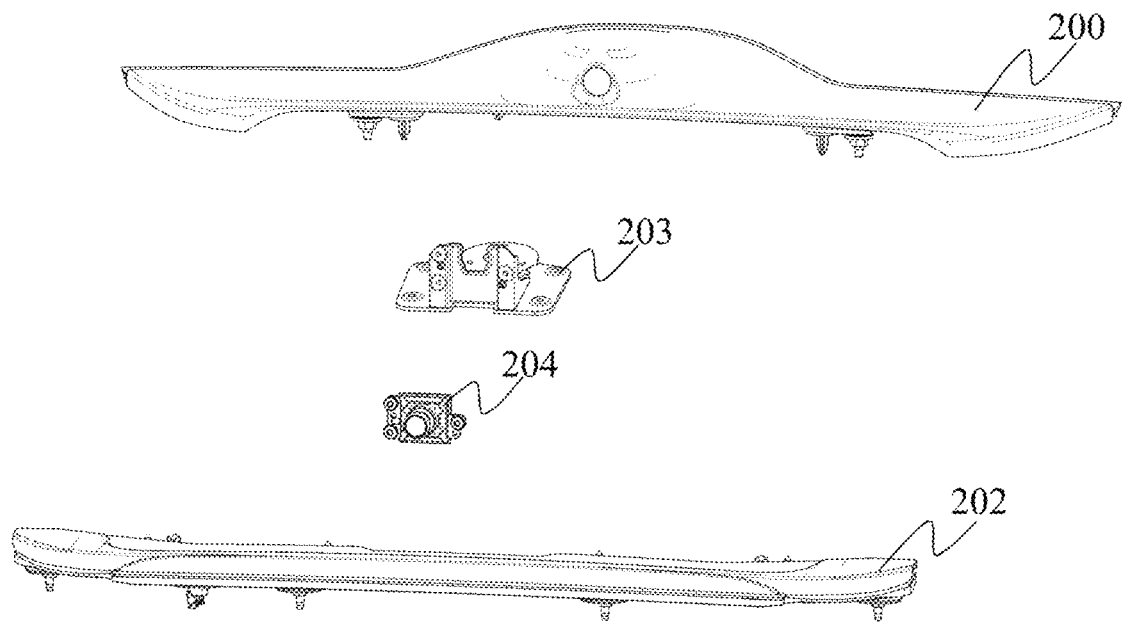
FIG. 8 shows an exploded view of components shown in FIG. 7.

FIG. 7 shows a rear view of a rear bracket body and components mounted thereto according to an embodiment of the present application. As shown in FIG. 7, a high-mount brake light 202 and an image sensor 204 are mounted to the rear bracket body 200. FIG. 8 is an exploded view of the rear bracket body shown in FIG. 7 and components mounted thereto. It can be seen in FIG. 8 that, the image sensor 204 is mounted to the rear bracket body 200 through an image sensor connecting piece 203. Here, the image sensor 204 is a rear view image sensor.

Figure 9:
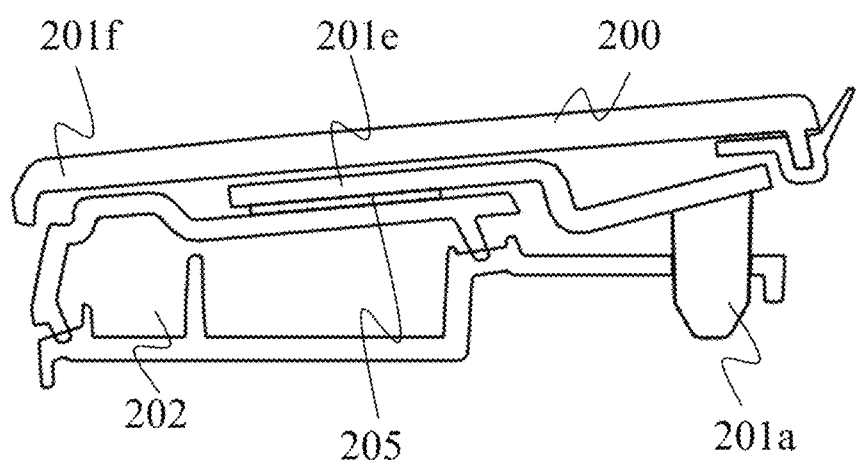
FIG. 9 shows a cross-sectional view of the components shown in FIG. 6 along the axis A-A'.

FIG. 9 is a cross-sectional view of each component in FIG. 6 along the axis A-A'. As shown in FIG. 9, a brake light connecting piece 201e is arranged on the rear bracket body 200, and the high-mount brake light 202 can be mounted to the brake light connecting piece 201e through a tape 205. It should be noted that, the high-mount brake light 202 can also be mounted to the brake light connecting piece 201e by other adhesive means, such as glue or the like. Wherein, the number of brake light connecting piece 201e may be one as shown in FIG. 9, or any other appropriate number depending on the situation. Also, the brake light connecting piece 201e and the image sensor connecting piece 203 may be integrated with the rear bracket body 200, or may be separate components from the rear bracket body 200. It can also be seen from FIG. 9 that the high-mount brake light 202 can be mounted to the brake light connecting piece 201a, i.e., a positioning pin 201a, by means of screws. In addition, it can be seen from FIG. 9 that, a brake light connecting piece 201f is also arranged on the rear bracket body 200. The high-mount brake light 202 is mounted to the brake light connecting piece 201f by means of an eaves tower connection.

The above-mentioned connecting pieces, i.e., the image sensor connecting piece 101, the image sensor connecting piece 102, the LiDAR connecting piece 103, the brake light connecting piece 201, and the image sensor connecting piece 203 may be collectively referred to as a connecting body. It should be noted that the "connecting body" used in this application may only include a part of the connecting pieces mentioned above, but not all the connecting pieces; it may also include other connecting pieces in addition to these connecting pieces. It should also be noted that the "connecting body" used in this application may be an integral component (eg. a connecting body comprises two image sensor connecting pieces and one LiDAR sensor connecting piece, and the three connecting pieces are manufactured as one component), or a combination of multiple separate components (eg. a connecting body is composed of three connecting pieces, as showed in FIG. 1, the image sensor connecting piece 101, the image sensor connecting piece 102, the LiDAR connecting piece 103). It should also be noted that, the connecting pieces included in the "connecting body" used in this application may be may be molded integrally with the front bracket body or the rear bracket body, or may be separated from the front bracket body or the rear bracket body. In addition, in order to provide better heat dissipation for the mounted sensor, the connecting body may be made by a cast aluminum process.

Figure 10:
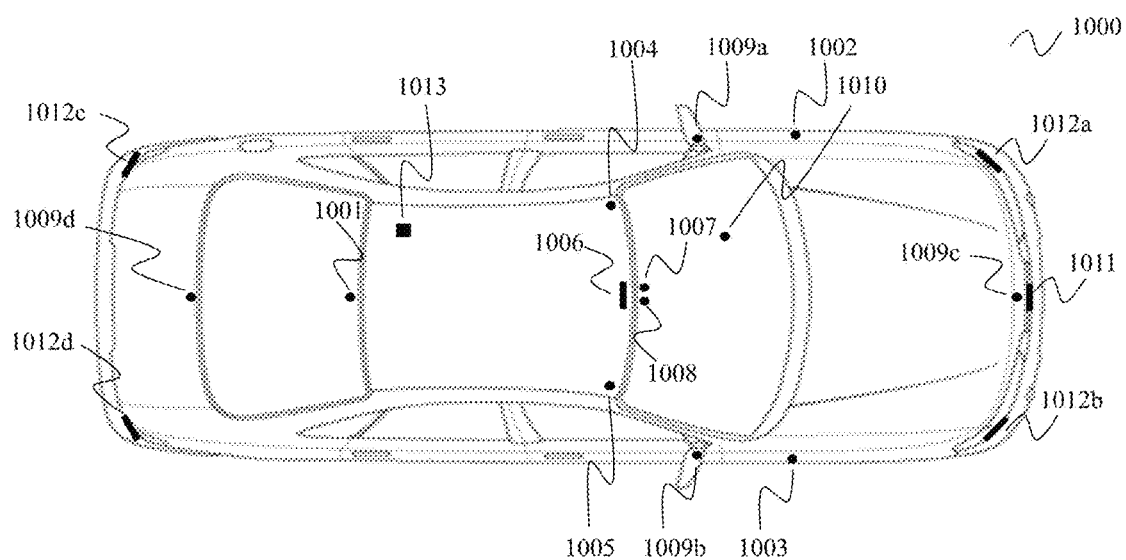
FIG. 10 shows a top view of a vehicle according to an embodiment of the present application.

FIG. 10 is a top view of a vehicle according to an embodiment of the present application. A bracket as shown in FIG. 2 is arranged on a vehicle 1000. A side front view image sensor 1004 and a side front view image sensor 1005 are arranged above an A pillar of the vehicle 1000 through the bracket. This allows the image sensor mounted thereto to have a wide field of view, reducing the blind zone of field of view for the image sensor. Wherein, the image sensor 1004 and the image sensor 1005 may be side front view image sensors, and the field of view between the two may have an overlapping area in the forward direction of the vehicle, so as to realize binocular ranging, and cooperate with each other to realize full coverage of the forward field of view of the vehicle. The LiDAR 1006 is mounted to the top of the vehicle 1000 through the bracket. Wherein, the LiDAR 1006 can cover scenes that cannot be accurately identified by the image sensors 1004 and 1005, such as large stationary objects, dark scenes at night, etc. In addition, the LiDAR 1006 can also dynamically adjust region of interest (ROI), thereby performing real-time and dynamic tracking for key targets, and dynamic staring key areas based on states of the vehicle.

Optionally, as shown in FIG. 10, a rear bracket body is also arranged on the vehicle 1000, for example, a rear side bracket body as shown in FIG. 7. The rear view image sensor 1001 is arranged on an upper edge of the rear window of the vehicle 1000 through the rear bracket body.

Optionally, the side rear view image sensors 1002 and 1003 are also arranged on the vehicle 1000 as shown in FIG. 10. The side rear view image sensors 1002 and 1003 may be specifically arranged on the fenders of the vehicle 1000. The combination of the rear view image sensor 1001, the side rear view image sensors 1002 and 1003, and the side front view image sensors 1004 and 1005 realizes full coverage of the surrounding environment of the vehicle body and ensures the continuity of tracking a target vehicle.

Optionally, the front view image sensors 1007 and 1008 are also arranged on the vehicle 1000 as shown in FIG. 10. The front view image sensor 1007 is a wide-angle camera, and the front view image sensor 1008 is a narrow-angle camera. Wherein, the front view image sensors 1007 and 1008 may be arranged behind the front window glass. The combination of front view narrow-angle and wide-angle cameras realizes the simultaneous perception of target at a long distance and that at a short distance.

Optionally, the surround view image sensors 1009a, 1009b, 1009c, and 1009d are also arranged on the vehicle 1000 as shown in FIG. 10. The surround view image sensors 1009a, 1009b may be arranged on the left and right side rear view mirrors of the vehicle, and the surround view image sensors 1009c, 1009d may be arranged at the front side and rear side of the vehicle, respectively. For example, the surround view image sensors 1009c, 1009d may be arranged on the front fender and the rear door trim of the vehicle, respectively. The surround view image sensors 1009a, 1009b, 1009c, and 1009d provide full coverage of the surrounding environment of the vehicle body.

When the surround view image sensors 1009a, 1009b, 1009c, and 1009d, as well as the rear view image sensor 1001, the side rear view image sensors 1002 and 1003, and the side front view image sensors 1004 and 1005 are used together, redundant sense of full coverage of the surrounding environment of the vehicle body can be provided. The pixel value of the surround view image sensors 1009a, 1009b, 1009c, and 1009d may be set to lower values than that of the rear view image sensor 1001, the side rear view image sensors 1002 and 1003, the side front view image sensors 1004 and 1005. For example, the pixel value of the surround view image sensors is set to 2M, the pixel value of other view image sensors is set to 8M. Since with higher pixel values long distance images can be monitored more accurately, and with lower pixel values better night sensitivity can provided, such configuration enables the vehicle 1000 to take into account of both long distance perception and high sensitivity perception.

Optionally, an in-vehicle image sensor 1010 is also arranged on the vehicle 1000 as shown in FIG. 10. The in-vehicle image sensor 1010 may be a driving monitor system (DMS) arranged on a steering pillar in the vehicle. The in-vehicle image sensor 1010 monitors the driver's fatigue state by monitoring the driver's eyelid beating among other parameters, and triggers a warning system when the driver's fatigue degree reaches a threshold.

Optionally, a forward millimeter wave radar 1011 is arranged on the front fender of the vehicle 1000 as shown in FIG. 10, and corner millimeter wave radars 1012a, 1012b, 1012c, and 1012d may also be arranged on the four corners of the vehicle 1000. The forward millimeter wave radar 1011 may be a long-range millimeter wave radar, and the corner millimeter wave radars 1012a, 1012b, 1012c, and 1012d may be medium-range millimeter wave radars.

In summary, the technical solution of the present application arranges the side front view image sensors above the A pillars through a bracket arranged on the top of the vehicle, so as to obtain a broad field of view and reduce the blind zone of field of view. The bracket arranged on the top of the vehicle can also integrate with components such as LiDAR, rear view image sensor, brake light, etc., which reduces the space requirement for structural design, reduces the assembly difficulty of the vehicle production line, and reduces the cumulative dimensional chain tolerance.

Although only some of the embodiments of the application are described above, those of ordinary skill in the art should understand that the application can be implemented in many other forms without departing from the spirit and scope of the application. Therefore, the presented examples and implementations are regarded as illustrative rather than restrictive, and the application may cover various modifications and alternatives without departing from the spirit and scope of the application as defined by the appended claims.

What is claimed:

1. A bracket assembly for a vehicle, characterized in that the bracket assembly comprising:
   a first bracket body mounted to the top of the vehicle between a front windshield and a top cover of the vehicle;
   a second bracket body mounted to the top of the vehicle between a top cover and a rear windshield of the vehicle; and
   a connecting body, comprising:
      a first connecting piece arranged on the left side of the first bracket body and mounted with a first image sensor,
      a second connecting piece arranged on the right side of the first bracket body and mounted with a second image sensor, wherein the first image sensor and the second image sensor are side front view image sensors,
      a third connecting piece arranged on the first bracket body and mounted with a LiDAR sensor, and
      a fourth connecting piece arranged on the second bracket body and mounted with a third image sensor, wherein the third image sensor is a rear view image sensor,
   wherein the first connecting piece and the second connecting piece are arranged above A pillars of the vehicle, the first image sensor and the second image sensor are symmetrical along the longitudinal axis of the vehicle, and the field of view between the first image sensor and the second image sensor have an overlapping area along the forward direction of the vehicle for binocular ranging, and wherein, the first bracket body and the second bracket body are arranged forward and backward along a longitudinal axis of the vehicle.

2. The bracket assembly according to claim 1, wherein the connecting body further comprises:

a fifth connecting piece arranged on the second bracket body and mounted with a brake light.

3. The bracket assembly according to claim 1, wherein, the first bracket body and the second bracket body are centrosymmetric along the longitudinal axis of the vehicle.

4. The bracket assembly according to claim 2, wherein, the third connecting piece, the fourth connecting piece and/or the fifth connecting piece are arranged on the longitudinal axis of the vehicle.

5. A device arranged on vehicle roof, characterized in that comprising:

a first bracket body mounted to the top of the vehicle between a front windshield and a top cover of the vehicle;

a connecting body, comprising;

a first connecting piece arranged on the left side of the first bracket body, a second connecting piece arranged on the right side of the first bracket body, and a third connecting piece arranged on the first bracket body, wherein the first connecting piece and the second connecting piece are arranged above A pillars of the vehicle;

a first image sensor mounted to the first connecting piece;

a second image sensor mounted to the second connecting piece, wherein the first image sensor and the second image sensor are side front view image sensors, the first image sensor and the second image sensor are symmetrical along the longitudinal axis of the vehicle, and the field of view between the first image sensor and the second image sensor have an overlapping area along the forward direction of the vehicle for binocular ranging; and a LiDAR mounted to the third connecting piece, wherein, the device on vehicle roof further comprises a second bracket body mounted to the top of the vehicle, and the first bracket body and the second bracket body are arranged forward and backward along a longitudinal axis of the vehicle, the connecting piece further comprises a fourth connecting piece arranged on the second bracket body, and the device on vehicle roof further comprises a third image sensor mounted to the fourth connecting piece, wherein the third image sensor is a rear view image sensor.

6. The device on vehicle roof according to claim 5, wherein, the connecting body further comprises a fifth connecting piece arranged on the second bracket body, and the device on vehicle roof further comprises a brake light mounted to the fifth connecting piece.

7. The vehicle according to cclaim 5, wherein further comprising:

two side rear view image sensors respectively arranged on fenders of the vehicle.

8. The vehicle according to claim 5, wherein further comprising:

one or more front view image sensors arranged behind the front window glass of the vehicle.

9. The vehicle according to claim 8, wherein, the number of the front view image sensors is two, and one of the front view image sensors is a wide-angle camera, and the other is a narrow-angle camera.

10. The bracket assembly according to claim 1, wherein, the first connecting piece and the second connecting piece are arranged symmetrically along a longitudinal axis of the vehicle.

11. The bracket assembly according to claim 1, wherein, the first bracket body is centrosymmetric along a longitudinal axis of the vehicle.

12. The bracket assembly according to claim 1, wherein, the third connecting piece is arranged on a longitudinal axis of the vehicle.

* * * * *